United States Patent [19]
Nagamura et al.

[11] Patent Number: 5,499,506
[45] Date of Patent: Mar. 19, 1996

[54] ULTRA-HIGH PURITY MONOSILANE PRODUCING PROCESS AND UNIT

[75] Inventors: Takashi Nagamura; Shinji Tomita, both of Hyogo, Japan

[73] Assignee: L'Air Liquide, Societe Anonyme pour l'Etude et l'Expolitation des Procedes Georges Claude, France

[21] Appl. No.: 256,970

[22] PCT Filed: Nov. 30, 1993

[86] PCT No.: PCT/EP93/03378

§ 371 Date: Nov. 16, 1994

§ 102(e) Date: Nov. 16, 1993

[87] PCT Pub. No.: WO94/12837

PCT Pub. Date: Jun. 9, 1994

[30] Foreign Application Priority Data

Dec. 1, 1992 [JP] Japan ................... 4-343536

[51] Int. Cl.$^6$ ....................................... F25J 3/00
[52] U.S. Cl. ........................................ 62/11; 62/24
[58] Field of Search ........................... 62/11, 23, 24

[56] References Cited

U.S. PATENT DOCUMENTS 4,755,201 7/1988 Eschwey et al. .................... 62/12

FOREIGN PATENT DOCUMENTS 61-63514 4/1986 Japan.

*Primary Examiner*—Ronald C. Capossela
*Attorney, Agent, or Firm*—Burns, Doane, Swecker & Mathis

[57] ABSTRACT

Provided is a process and an apparatus for producing ultra-high purity monosilane. In a preferred embodiment, the process comprises introducing a monosilane feed gas, which also serves as a heat source, to the lower stage of a rectification column which is sectioned into an upper stage, a middle stage and a lower stage by means of an intermediate portion reboiler-condenser and a lower portion reboiler-condenser. The monosilane feed gas is cooled in the lower portion of the reboiler-condenser so that the higher boiling point components in the feed gas are separated. The remaining lower boiling point components are then introduced into the upper stage by way of the middle stage and the intermediate portion of the reboiler-condenser. The remaining components are condensed in the top portion of the upper stage so that monosilane and the lower boiling point components are separated, with the condensed monosilane becoming a reflux liquid. Ultra-high purity monosilane is thereby obtained and removed from the bottom portion of the upper stage of the unit.

7 Claims, 1 Drawing Sheet

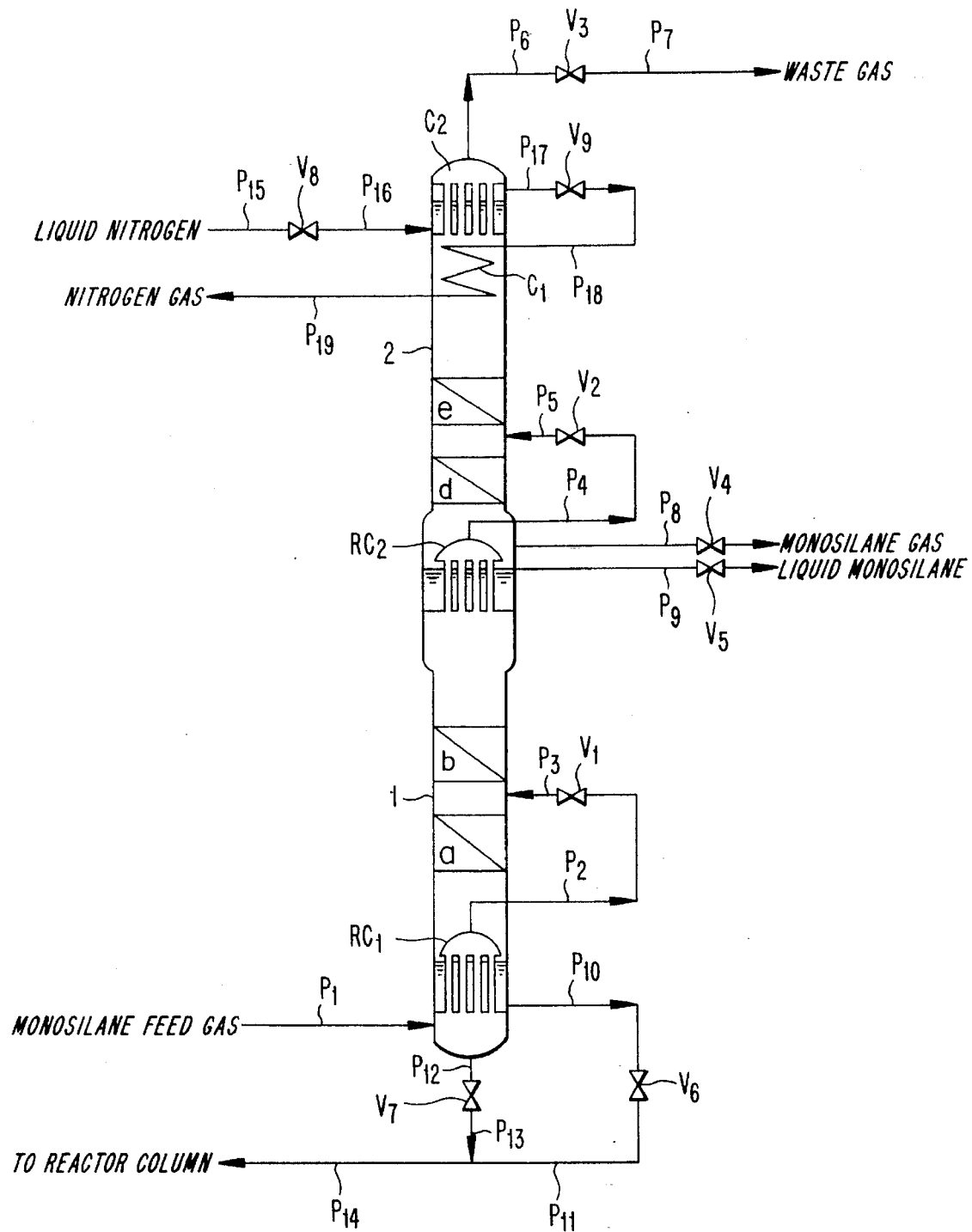

ULTRA-HIGH PURITY MONOSILANE PRODUCING PROCESS AND UNIT

The present invention relates to a ultra-high purity monosilane producing process and a unit therefor, and especially to a process for producing ultra-high purity monosilane gas or liquid monosilane which is free from hydrogen having a lower boiling point than that of monosilane and from chlorides or the like having higher boiling points than that of monosilane by liquefying and rectifying a monosilane feed gas, and a unit therefor.

In general, monosilane gas or the like is indispensable for the manufacture of super LBl, solar cells and photosensitive substances.

A process for producing such monosilane gas is described in Japanese Patent Publication No. 3,806/1989.

For such monosilane gas, monosilane gas having a high purity, for example of 99.9999% or more is preferable. At present, however, processes and units capable of continuously obtaining such ultra-high purity monosilane gas as mentioned above have not yet been developed.

The present invention is intended to achieve the aforementioned purpose.

The ultra-high purity monosilane producing process according to the present invention is characterized by comprising:

introducing a monosilane feed gas to the lower potion of a rectification column;

indirectly cooling down and liquefying monosilane obtained through rectification of the feed gas by the rectification column, by refrigeration in the upper portion of the rectification column, thereby providing a reflux liquid; and rectifying the reflux liquid by contact with the feed gas so that components other than monosilane are separated from the feed gas, thereby obtaining ultra-high purity monosilane gas or liquefied monosilane.

Preferably, the process further comprises:

a step of introducing a monosilane feed gas to the lower stage of a duplex rectification column which is sectioned into an upper stage, a middle stage and a lower stage by means of respective reboiler-condensers disposed in each of its lower potion and intermediate potion so that the feed gas is cooled down and condensed by cold in the lower portion reboiler-condenser, thereby separating and removing higher boiling point components from the feed gas;

a step of reducing the pressure of the remaining component; and introducing the pressure-reduced component to the middle stage of the duplex rectification column so that the pressure-reduced component is cooled down and condensed by cold in the intermediate portion reboiler-condenser, thereby providing a reflux liquid; and a step of reducing the pressure of a lower boiling point gas component in the middle stage; and introducing the pressure-reduced gas component to the upper stage of the duplex rectification column so that the pressure-reduced gas component is cooled down and condensed by cold in a condenser disposed in the top portion of the upper stage, thereby separating monosilane gas as a reflux liquid from the lower boiling point gas component.

The ultra-high purity monosilane producing unit according to the present invention is characterized by comprising:

a rectification column having a lower stage and an upper stage.

means for introducing a monosilane feed gas into said lower stage;

means for indirectly cooling and liquefying gaseous monosilane obtained through rectification of said feed gas, to provide a reflux liquid.

Preferably, the unit further comprises:

a duplex rectification column which is sectioned into an upper stage, a middle stage and a lower stage by means of a reboiler-condenser disposed in each of a lower portion and an intermediate portion of said column;

an upper side rectifying portion and a lower side rectifying portion disposed in each of the upper stage and middle stage;

an expansion valve for introducing the monosilane feed gas introduced in the lower stage between the upper side and lower side rectifying portions in the middle stage by way of the lower portion reboiler-condenser;

an expansion valve for introducing the feed gas in the middle stage between the upper side and lower side rectifying portions in the upper stage by way of the intermediate portion reboiler-condenser;

said means for indirectly cooling and liquefying gaseous monosilane comprising:

a cooling condenser disposed in the top portion of the upper stage; and a means for supplying refrigeration to the cooling condenser, wherein ultra-high purity monosilane gas or liquefied monosilane is obtained from the lower portion of the upper stage.

One embodiment of the present invention will be described referring to the Figure, which is an illustrative view of a unit for use with a process according to the invention.

In the present invention, a monosilane feed gas is used as feed fluid.

The composition of a monosilane feed gas used in one embodiment of the present invention and the boiling points of its component gases are as shown in Table 1.

TABLE 1

| Composition of monosilane feed gas | % | Boiling point (°C. at 1 atm) |
|---|---|---|
| Hydrogen ($H_2$) | 16.0 | −252.9 |
| Monosilane ($SiH_4$) | 69.2 | −111.5 |
| Monochlorosilane ($SiH_3Cl$) | 4.1 | −30.4 |
| Dichlorosilane ($SiH_2Cl_2$) | 9.9 | 8.2 |
| Trichlorosilane ($SiHCl_3$) | 0.8 | 31.8 |

In one embodiment of the present invention, a duplex rectification column is composed of a lower column 1 and an upper column 2. In the lower portion and top portion of the said lower column 1 are respectively disposed a first reboiler-condenser $RC_1$, and a second reboiler-condenser $RC_2$, and in the top portion of the said upper column 2 are disposed cooling condensers $C_1$ and $C_2$. For instance, a monosilane feed gas having the composition shown in Table 1 is introduced below the reboiler-condenser $RC_1$, positioned in the lower portion of the lower column 1 of the said duplex rectification column through a pipe $P_1$ at a temperature of about 0° C. and a pressure of about 2.5 kg/cm²G, so as to be cooled with a mixed liquid of monosilane and monochlorosilane reservoired in the reboiler-condenser $RC_1$ which will be hereinafter described. As a result, almost all quantities of dichlorosilane and trichlorosilane are liquefied and reservoired in the bottom portion of the lower column 1 of the duplex rectification column. The hydrogen, monosilane and monochlorosilane which have not been liquefied are led out of the lower column 1 of the duplex rectification column through a pipe $P_2$ from the top portion of the reboiler-condenser $RC_1$, reduced in pressure by an expansion valve $V_1$, and introduced between the lower side rectifying portion a and upper side rectifying portion b in the lower column 1 of the duplex rectification column through a pipe $P_3$.

The mixed gas of hydrogen, monosilane and monochlorosilane introduced through the pipe $P_3$ is rectified while it rises in said upper side rectifying portion b, and the risen gas is cooled down by cold in the reboiler-condenser $RC_2$, disposed in the top portion of the lower column 1 of the duplex rectification column so that a portion thereof is condensed and liquefied, and the liquefied gas is caused to flow down in the rectifying portions b and a as a reflux liquid, and reservoired in a reservoir portion of the reboiler-condenser $RC_1$.

The liquid reservoired in this reservoir portion is heated by the said monosilane feed gas passing through the reboiler-condenser $RC_1$ so that monosilane in the reservoired liquid is evaporated. The evaporated monosilane is rectified while it rises in the rectifying portions a and b, and the rectified monosilane reaches the reboiler-condenser $RC_2$.

The mixed gas of hydrogen and monosilane which has been rectified in the rectifying portions a and b is taken out through a pipe $P_4$ from the top portion of the reboiler-condenser $RC_2$, reduced in pressure by an expansion valve $V_2$, and introduced between the lower side rectifying portion d and upper side rectifying portion e of the upper column 2 of the duplex rectification column through a pipe $P_5$.

The mixed gas of hydrogen and monosilane introduced through the pipe $P_5$ is rectified while it rises in the upper side rectifying portion e of the upper column 2 of the duplex rectification column, and the risen mixed gas is further introduced to a lower portion of the condensers $C_1$ and $C_2$ disposed in the top portion of the upper column 2 of the duplex rectification column, so as to be cooled down through an indirect heat exchange with liquid nitrogen introduced in the condensers $C_1$ and $C_2$ as cold, which will be hereinafter described. As a result, monosilane is condensed and liquefied, and the liquefied monosilane is caused to flow down through the rectifying portions e and d in the upper column 2 of the duplex rectification column as a reflux liquid. This reflux liquid is rectified in the rectifying portions e and d by an evaporated gas coming from the reservoir portion of the reboiler-condenser $RC_2$, and reservoired in the reboiler-condenser $RC_2$. The reservoired liquid in this reboiler-condenser $RC_2$ is heated and evaporated by the said mixed gas of hydrogen and monosilane passing through the reboiler-condenser $RC_2$, and the evaporated liquid is rectified while it rises in the rectifying portions d and e, and reaches the top portion of the upper column 2. The gas in the top portion of the upper column 2 is cooled down by the condensers $C_1$ and $C_2$, and as a result, monosilane is condensed and liquefied and the remaining hydrogen gas is concentrated to over 99%. The hydrogen which has been reduced in pressure to a pressure of about 1.2 kg/cm$^2$G or less, and which has been not liquefied is sent out of the unit through a pipe $P_6$, a valve $V_3$ and a pipe $P_7$. By virtue of the above mentioned construction, ultra-high purity monosilane having a purity of 99.9999% or more is produced in the liquid reservoir portion of the reboiler-condenser $RC_2$. Thus, this will be taken out as an ultra-high purity monosilane gas product having a temperature of about −95° C. and a pressure of about 1.3 kg/cm$^2$G through a pipe $P_8$ and a valve $V_4$ from the upper portion of the reboiler-condenser $RC_2$, or as an ultra-high purity liquid monosilane product through a pipe $P_9$ and a valve $V_5$ from the liquid reservoir portion of the reboiler-condenser $RC_2$.

The monosilane and monochlorosilane reservoired in the liquid reservoir portion of said reboiler-condenser $RC_1$ are taken out through a pipe $P_{10}$ from the bottom portion of the reboiler-condenser $RC_1$, reduced in pressure by a valve $V_6$, passed through a pipe $P_{11}$, and then returned, together with liquefied dichlorosilane and trichlorosilane led out of the lower end of the lower column I of the duplex rectification column through a pipe $P_{12}$, a valve $V_7$ and a pipe $P_{13}$, to a reactor column through a pipe $P_{14}$.

A cold source and a heating source necessary for operating the aforementioned duplex rectification column will be described below.

For a cold source necessary for operating the duplex rectification column, there will be used a refrigerant having a temperature of −160° C. or less such as liquefied natural gas or liquid nitrogen. For instance, liquid nitrogen is fed from the outside through a pipe $P_{15}$ and a valve $V_8$ so that its temperature is brought to such a temperature that monosilane is not solidified, and then it is introduced into the said condenser $C_2$ through a pipe $P_{16}$. Thus, the mixed gas of monosilane and hydrogen in the top portion of the upper column 2 of the duplex rectification column is indirectly cooled down by the liquid nitrogen introduced in the condenser $C_2$.

Through the abovementioned cooling, the liquid nitrogen in the condenser $C_2$ is gasified to provide nitrogen gas, and this nitrogen gas is passed through a pipe $P_{17}$, an expansion valve $V_8$ and a pipe $P_{18}$, and introduced into the condenser $C_1$ in the upper column 2 of the duplex rectification column so that the mixed gas of hydrogen and monosilane is previously cooled down in an indirect manner. Then, the nitrogen gas which has been somewhat raised in temperature as a result of this previous cooling is exhausted from a pipe $P_{19}$.

The monosilane feed gas having a temperature of about 0° C., introduced below the reboiler-condenser $RC_1$ of the lower column 1 of the duplex rectification column, is used as a heating source necessary for operating the duplex rectification column.

The ultra-high purity monosilane producing process and unit therefor according to the present invention enable ultra-high purity monosilane gas and liquid monosilane to be obtained easily and continuously.

We claim:

1. A process for producing ultra-high purity monosilane which comprises introducing a monosilane feed gas containing a mixture of gaseous components into a lower portion of a rectification column having a lower portion and an upper portion;

indirectly cooling and liquefying monosilane contained in the feed gas by condensing the monosilane in the upper portion of the rectification column to thereby provide a monosilane reflux liquid;

rectifying the reflux liquid by contact with the feed gas so that the components other than the monosilane are separated from the feed gas and removed from the column; and recovering ultra-high purity monosilane gas or liquid monosilane from the column.

2. The process of claim 1, further comprising:

a step of introducing a monosilane feed gas to the lower stage of a duplex rectification column which is sectioned into an upper stage, a middle stage and a lower stage by means of respective reboiler-condensers disposed in each of its lower portion and intermediate portion so that the feed gas is condensed in the lower portion reboiler-condenser, thereby separating and removing higher boiling point components from the feed gas;

a step of reducing the pressure of the remaining component and introducing the pressure-reduced component to the middle stage of the duplex rectification column so that the pressure-reduced component is condensed in the intermediate portion reboiler-condenser, thereby providing a reflux liquid; and a step of reducing the pressure of a lower boiling point gas component in the middle stage and introducing the pressure-reduced gas component to the upper stage of the duplex rectification column so that the pressure-reduced gas component is condensed in a condenser disposed in the top portion of the upper stage, thereby separating monosilane gas as a reflux liquid from the lower boiling point gas component.

3. An ultra-high purity monosilane producing unit which comprises a rectification column having a lower stage and an upper stage;

means for introducing a monosilane feed gas containing a mixture of gaseous components into said lower stage;

means for indirectly cooling and liquefying gaseous monosilane by condensing the monosilane in the upper stage of the rectification column to thereby provide a monosilane reflux liquid;

means for removing from the column components other than monosilane which are separated from the monosilane gaseous feed; and means for recovering ultra-high purity monosilane gas or liquid monosilane from the column.

4. The unit of claim 3, wherein said means for indirectly cooling and liquefying gaseous monosilane comprises means for vaporizing a refrigerant in the upper stage of said column.

5. The unit according to claim 4, wherein said refrigerant is nitrogen or liquefied natural gas.

6. A unit as claimed in any one of claims 3–5, wherein the unit further comprises a rectification column which is a duplex rectification column sectioned into an upper stage, a middle stage and a lower stage by means of a reboiler-condenser disposed in a lower portion and a reboiler-condenser disposed in an intermediate portion of the column;

an upper side rectifying portion and a lower side rectifying portion disposed in each of the upper stage and middle stage;

means for introducing monosilane feed gas from the lower stage to a position between the upper side and lower side rectifying portions in the middle stage by way of the lower portion reboiler condenser;

means for introducing the feed gas in the middle stage to a position between the upper side and lower side rectifying portions in the upper stage by way of the intermediate portion reboiler condenser;

a cooling condenser disposed in the top portion of the upper stage with means for supplying refrigerant to the cooling condenser; and means for recovering ultra-high purity monosilane gas or liquid monosilane from the lower portion of the upper stage of the column.

7. The unit of claim 6, wherein the means for introducing the monosilane feed gas from the lower stage to a position between the upper side and lower side rectifying portions in the middle stage by way of the lower portion reboiler condenser is an expansion valve; and the means for introducing the feed gas into the middle stage at a position between the upper side and lower side rectifying portions and the upper stage by way of the intermediate portion reboiler-condenser comprises an expansion valve.

* * * * *